United States Patent [19]
Kumabe et al.

[11] Patent Number: 5,853,761
[45] Date of Patent: Dec. 29, 1998

[54] STABILIZING AGENT FOR OLEAGINOUS, PHYSIOLOGICALLY ACTIVE SUBSTANCES

[75] Inventors: Kiyoshi Kumabe, Funabashi; Hiroyuki Yanaka, Hino; Takayuki Kondo, Edogawa; Jun Shirai, Yokohama, all of Japan

[73] Assignee: Fujisawa Pharmaceutical Co., Ltd., Osaka, Japan

[21] Appl. No.: 875,601

[22] PCT Filed: Feb. 6, 1996

[86] PCT No.: PCT/JP96/00235

§ 371 Date: Aug. 4, 1997

§ 102(e) Date: Aug. 4, 1997

[87] PCT Pub. No.: WO96/25053

PCT Pub. Date: Aug. 22, 1996

[30] Foreign Application Priority Data

Feb. 13, 1995 [JP] Japan .................................. 70-23824
Sep. 8, 1995 [JP] Japan .................................. 7-231127

[51] Int. Cl.⁶ .................................................. A61K 9/16
[52] U.S. Cl. ..................... 424/484; 424/76.3; 424/76.4; 424/438; 424/442; 424/451; 424/464; 424/488; 574/560; 574/578

[58] Field of Search ...................... 424/400, 401, 424/438, 439–442, 451, 464, 484, 485, 488, 489–491, 499, 502, 76.3, 76.4; 514/578, 560

[56] References Cited

U.S. PATENT DOCUMENTS 4,165,392  8/1979  Kawai et al. ............................ 426/657
4,430,356  2/1984  Ohyabu et al. ......................... 426/574

OTHER PUBLICATIONS

Milko et al. p. 450 Calcium Gluconate, 1949.

*Primary Examiner*—Neil S. Levy
*Attorney, Agent, or Firm*—Oblon, Spivak, McClelland, Maier & Neustadt, P.C.

[57] ABSTRACT

The invention relates to a solid preparation containing an oleaginous, physiologically active substance which comprises the oleaginous, physiologically active substance, calcium gluconate, a reticular matrix-forming agent, and a sticking agent. It is a stable preparation which does not give off an odor even when added to a beverage or the like.

14 Claims, No Drawings

STABILIZING AGENT FOR OLEAGINOUS, PHYSIOLOGICALLY ACTIVE SUBSTANCES

TECHNICAL FIELD

This invention relates to a stabilizing agent for oleaginous, physiologically active substances and to a preparation containing the stabilizing agent.

BACKGROUND ART

Oleaginous physiologically active substances (e.g. DHA) are difficult to work with and, for the ease of ingestion, are conventionally sealed in capsules or adsorbed on a particulate substrate and over-coated. However, such products are not sufficiently stable or the resulting granules or tablets, for instance, are bulky and often not suited at all for addition to general food. To overcome the disadvantages, a calcium encrustation technology using milk calcium as a chief shell-forming material was developed (New Food Industry, 36, 9, 38–42, 1994) but even the preparations provided by this technology are unstable and give off malodors when incorporated in, for example, beverages or drinks, thus leaving the problem unsolved.

DISCLOSURE OF INVENTION

To solve the problem, the inventors of this invention did much research and as a consequence discovered that calcium gluconate is a very useful stabilizing agent for oleaginous, physiologically active substances and that by using this calcium gluconate in combination with a reticular matrix-forming agent and/or an sticking agent, very stable preparations free from the above-mentioned disadvantages can be provided.

Thus, calcium gluconate is a calcium compound of relatively high water-solubility and when 100 g of the compound is put in 1 liter of water, about 30 grams of the input compound dissolve in the water while about 70 grams remain suspended. When an oleaginous, physiologically active substance is added to this liquid and the mixture is emulsified with stirring, the calcium not dissolved in water is adsorbed on each oil globule to form a shell layer on its surface. The dissolved calcium gluconate enters and fills up the interstice between shell-formed particles. When the mixture in this condition is quickly dried, there is obtained a powdery preparation containing the oleaginous, physiologically active substance hermetically trapped or masked.

It was also found that when a reticular matrix-forming agent and/or a sticking agent is used in combination with the above-mentioned calcium gluconate, the stability of the preparation is further enhanced and when this preparation is added to a beverage, for instance, there is obtained a stable, odorless product.

The oleaginous, physiologically active substance that can be used advantageously in accordance with this invention includes a variety of oily physiologically active substances which have their own peculiar tastes and/or odors and are unstable against enzymes, oxygen, light, and heat. A typical but by no means exclusive list of such substances includes highly unsaturated fatty acids such as DHA (docosahexaenoic acid), EPA (eicosapentaenoic acid), etc., fat-soluble vitamins such as vitamin D, vitamin E, vitamin K, etc., and carotenes such as β-carotene.

Now, while DHA and EPA, for instance, occur at high levels in fish oil and usually exist in the triglyceride form, the term DHA or EPA as used throughout this specification means not only DHA or EPA as such but also the corresponding glycerin ester (e.g. triglyceride), alkyl ester (e.g. ethyl ester), or other derivative.

As to DHA and EPA, purified fish oils containing 20–100% of them are commercially available and can be utilized.

The reticular matrix-forming agent that can be used in this invention includes milk calcium, milk casein or its hydrolyzate [for example, casein phosphopeptides which are partial hydrolyzates available on digestion of casein with protease (e.g. trypsin) (CPP: CPP-I, CPP-II, CPP-III, etc.) (New Food Industry, 35, No. 9 (1993), pp. 1–8), etc.], and polysaccharides such as pectin. Among them, each of milk calcium and CPP has both the property to form a reticular matrix and the property to function as a sticking agent as will be described hereinafter. Therefore, those substances may respectively be expected to double as a reticular matrixing agent and a sticking agent.

The sticking agent includes thicking agents (e.g. CMC, starch, dextrin, pullulan, gum arabic, etc.) and gelling agents (e.g. gelatin, carrageenin, alginic acid salts, etc., which may be used either singly or in combination), among other substances.

The stabilizing agent for oleaginous, physiologically active substances as provided by this invention, which is either calcium gluconate as such or a mixture of calcium gluconate, said reticular matrix-forming agent, and said sticking agent, can be added, either as it is or in the form of a preparation prepared using a suitable carrier beforehand, to the oleaginous, physiologically active substance to provide a variety of products in the conventional manner.

The preparation containing an oleaginous, physiologically active substance includes the usual solid preparations such as powders, beads, fine granules, granules, tablets, capsules, etc.

In the manufacture of a preparation containing an oleaginous, physiologically active substance according to the invention, any of the conventional diluents, excipients, disintegrators, etc. can be employed.

In many instances, satisfactory results are obtained when an emulsifier or dispersant, such as xanthan gum, lecithin, yoghurt, sucrose esters of fatty acids, glycerol esters of fatty acids, etc., is employed.

The proportion of calcium gluconate in the preparation is generally 20–90% (weight %; the same applies hereinafter) and preferably about 50–90%.

The preferred proportion of the reticular matrix-forming agent is 1–20% and the preferred proportion of the sticking agent is about 0.2–8%.

Below described is a typical process for production of the preparation (powders) comprising the oleaginous, physiologically active substance, calcium gluconate, and said reticular matrix-forming agent and/or sticking agent according to the present invention.

Purified water is mixed with the reticular matrix-forming agent (e.g. CPP) and a emulsifier such as xanthan gum and lecithin. To this mixture is added the oleaginous, physiologically active substance (e.g. DHA-containing fish oil) and the mixture is stirred to mix. Then, calcium gluconate and said sticking agent are added and the mixture is subjected to intense stirring or treatment with a high-pressure homomixer (to thereby elevate the zeta potential to $\leq -30$ mV or preferably $\leq -100$ mV). The mixture is dried and pulverized.

Here, drying can be achieved by any of the conventional air circulation, vacuum, freeze, spray, and other drying methods.

The following test examples compare the preparation of this invention with the conventional preparation.

TEST EXAMPLE 1

Preparation of this invention: the preparation obtained in Example 1 presented hereinafter Conventional preparation: the preparation obtained by the following process A beaker was charged with 100 g of DHA-containing purified oil (DHA content: 27%), 300 g of microfine milk calcium powder under a 200-mesh sieve ("Milk Serum Calcium Powder for Food" prepared by Healthway K.K.), and 1.0 liter of water and the charge was stirred using a high-speed homogenizer at 8000 rpm for 10 minutes. Then, 200 ml of 0.3% aqueous solution of sodium alginate was added and the charge was agitated at 2000 rpm for 5 minutes.

Then, using a spray dryer, the mixture was treated at an inlet temperature of 120° C. or less to provide 180 g of DHA-containing purified fish oil-including calcium powders.

TABLE 1

| Comparison parameter | Preparation of this invention | Conventional preparation |
|---|---|---|
| Appearance | White powders | Yellowish white powders |
| Particle size (mesh) | 110 | 170 |
| Shelf-life (atmospheric temperature) | ≧1 year | ≧1 year |
| Heat stability | 150° C./10 min. (decomp.) | 200° C./15 min. (decomp.) |
| Solubility in water | Substantially dissolved, rapidly dispersed | Insoluble |
| Suspendability in water | Good (no precipitation for a few days) | Precipitated in 2–3 hours |
| Processability | Suited for all food products | Good kneading and baking performance and good compressibility |
| Application to beverages | No objectionable taste or odor; good mouth feeling | Fish odor and taste unmasked; gritty mouthfeel |

TABLE 2

The critical amount of each preparation which does not give a fish odor/taste when added to 100 cc of water, milk, or yoghurt (the figure in parentheses represents the DHA equivalent)

| | Preparation of this invention (mg) | Conventional preparation (mg) |
|---|---|---|
| Water | 500 (20) | 125 (5) |
| Milk | 2,500 (100) | 250 (10) |
| Yoghurt | 5,000 (200) | 375 (15) |

TEST EXAMPLE 2

Jellies were produced using the same DHA-containing preparation as used in Test Example 1 (the preparation obtained in Example 1) or the conventional preparation (the same preparation as used in Test Example 1) and the respective products were organoleptically evaluated for the intensity of fish odor.

Jelly Formulas

TABLE 3

| Material | Control (g) | Test group 1 (preparation of this invention) (g) | Test group 2 (conventional preparation) (g) |
|---|---|---|---|
| Concentrated orange juice | 500 | 500 | 500 |
| Water | 1000 | 1000 | 1000 |
| Granulated sugar | 80 | 80 | 80 |
| Carrageenin | 18 | 18 | 18 |
| Potassium dihydrogen phosphate | 3 | 3 | 3 |
| Sodium citrate | 3 | 3 | 3 |
| DHA-containing preparation of this invention | — | 12 Note) | — |
| Conventional DHA-containing preparation | — | — | 12 Note) |
| Total | 1604 | 1616 | 1616 |

Note) As DHA, about 30 mg/100 g

Production of Jellies

Granulated sugar, carrageenin, potassium dihydrogen phosphate, sodium citrate, and DHA preparation were preliminarily blended thoroughly and the powder was dispersed uniformly in one-half volume of water. Then, concentrated juice and the balance of water were mixed and added. The whole mixture was heated to a temperature of 85° C. or higher to give a homogeneous solution and, after dissipation of excess heat, transferred to cups for cooling, whereby jelly products were obtained.

Panel Test Procedure

Using the control jelly as a reference, each test product was organoleptically evaluated according to the following criteria. The panel consisted of 10 tasters.

| | Score |
|---|---|
| No difference from control (no fish odor) | 0 |
| Faintly stronger than control in fish odor | 1 |
| Slightly stronger than control in fish odor | 2 |
| Definitely stronger than control in fish odor | 3 |
| Considerably stronger than control in fish odor | 4 |

Results

TABLE 4

| | Score | | | | | Mean score |
|---|---|---|---|---|---|---|
| | 0 | 1 | 2 | 3 | 4 | |
| Test group 1 | 8 person | 2 | 0 | 0 | 0 | 0.2 |
| Test group 2 | 0 person | 1 | 0 | 9 | 0 | 2.8 |

The fish odor of the jelly prepared with addition of the DHA-containing preparation of this invention was found to have been definitely masked as compared with the jelly produced with addition of the conventional DHA-containing preparation.

TEST EXAMPLE 3

The same DHA-containing preparation of this invention as used in Test Example 1 (the preparation obtained in Example 1) and the conventional preparation (the same preparation as used in Test Example 1) were respectively added to soya milk and the products were organoleptically evaluated for the intensity of fish odor.

Panel Test Procedure

Using she control soya milk as a reference, the test products were evaluated according to the same criteria as used in Test Example 2. The panel consisted of 4 tasters.

Results

TABLE 5

| Amount of DHA added (mg/100 g) | Preparation of this invention | Conventional preparation |
|---|---|---|
| 10 | 0 | 0.75 |
| 20 | 0 | 1.25 |
| 40 | 0 | 1.75 |
| 83 | 0.75 | 2.50 |
| 167 | 1.0 | 3.25 |
| 333 | 1.25 | 3.75 |

Note)
Each figure in the table represents the mean score.

The soya milk produced with addition of the DHA-containing preparation of the invention was definitely weaker in fish odor than the soya milk produced with addition of the conventional preparation, indicating that DHA can be added at a higher concentration.

TEST EXAMPLE 4

The vitamin E-containing preparation of the invention (the preparation obtained in Example 4) and the conventional vitamin E-containing preparation prepared by the method described below were respectively added to cow milk and drink yoghurt [Bulgaria Drink Yoghurt, Meiji Milk Products Co., Ltd.) in a proportion of 1.25 g (100 mg as vitamin E)/100 g and the odor and mouth feeling of each product was evaluated against the control product. As regards formation of precipitates, each drink was allowed to stand at 4° C. for 24 hours and visually evaluated.

Conventional Vitamin E-containing Preparation

A vitamin E-containing powder was prepared by the same procedure as described in Example 4 except that milk calcium powder [Milk Serum Calcium Powder, Healthway K.K.] was used in lieu of calcium gluconate as the shell-forming substance.

Results

TABLE 6

|  | Odor | | Mouth feeling | | Formation of precipitates | |
|---|---|---|---|---|---|---|
|  | Preparation of this invention | Conventional preparation | Preparation of this invention | Conventional preparation | Preparation of this invention | Conventional Preparation |
| Milk | Not different from control | Not different from control | Not different from control | Slightly rough to the tongue | No | Yes |
| Drink yoghurt | Same as above | Same as above | Same as above | Same as above | Same as above | Same as above |

The products prepared with addition of the vitamin E-containing powder of this invention were superior to the products prepared with addition of the conventional vitamin E-containing powder in both mouth feeling and formation of precipitates.

TEST EXAMPLE 5

The DHA-containing preparation of this invention (the preparation obtained in Example 1) and the conventional preparation (the same preparation as used in Test Example 1) were respectively taken in beakers and stored in open condition at 30° C./90% RH for 2 months. Then, the DHA content and the peroxide value (POV) of each preparation were determined.

Results

TABLE 7

| Storage period in days | | 0 | 14 | 28 | 60 |
|---|---|---|---|---|---|
| Preparation of this invention | DHA content | 23.3 | — | — | 23.2 |
|  | POV | 0.7 | 0.3 | 0.3 | 0.3 |
| Conventional preparation | DHA content | 23.8 | — | — | 23.5 |
|  | POV | 1.4 | 0.7 | 0.7 | 1.2 |

The DHA-containing preparation of this invention is superior to the conventional preparation in terms of resistance to oxidation, too.

Thus, compared with the hithereto-known preparation, the preparation according to this invention is superior in masking performance and hydrophilicity and does not give off an objectionable odor even when added to a beverage.

The preparation of this invention can be used as it is or as added to various types of food. Since it does not give off any objectionable odor even when added to various beverages, the preparation can be applied to a broad spectrum of food products inclusive of beverages.

Furthermore, the preparation of this invention is of value in the field of health food because, in addition to the physiological efficacies attributable to physiologically active substances added, it supplements calcium and has intestinal bifidobacteria growth promoting activity.

The following examples are further illustrative of the invention.

EXAMPLE 1

(Production of a DHA-containing Powdery Preparation)

In 3,000 kg of purified water were dissolved 160 kg of casein phosphopeptides, Meiji CPP-I™ (Meiji Seika Kaisha, Ltd.), 1.3 kg of xanthan gum, 8.5 kg of lecithin, and, as a sticking agent, 1.8 kg of a mixture of gelatin and carrageenin (9:1), with stirring (700–1,500 rpm) to mix. Then, 170 kg of DHA-containing fish oil (prepared by Harima Kasei K.K.; DHA content 23%) was added to the above mixture, and pre-emulsification was carried out at 2,000–5,000 rpm. Finally, 650 kg of fine calcium gluconate powder was added and the mixture was further stirred at 1,000 rpm. It was subjected to a pressure of 200 kg/cm$^2$ in a high-pressure homogenizer and, then, pulverized with a nozzle spray drier to provide 810 kg of a DHA-containing powdery preparation.

EXAMPLE 2

(Production of an EPA-containing Powdery Preparation)

Using 190 kg of purified fish oil with an EPA content of 40% in lieu of the DHA-containing fish oil used in Example 1, the procedure of Example 1 was otherwise repeated to provide 845 kg of an EPA-containing powdery preparation.

EXAMPLE 3

(Production of a β-carotene-containing Powdery Preparation)

Using 120 kg of soybean oil with a β-carotene content of 20% (Nippon Roche K.K.) in lieu of DHA-containing fish oil, the procedure of Example 1 was repeated to provide 623 kg of a β-carotene-containing powdery preparation.

EXAMPLE 4

To 70 g of purified water were added 1.5 g of casein sodium, 0.04 g of xanthan gum, 0.25 g of lecithin, and 1.2 g of a mixture of gelatin, pullulan, and K-carrageenin (13.2:12.0:1.3) and the mixture was stirred. Then, 6 g of vitamin E-containing oil (vitamin E content: 40%) was added and the mixture was pre-emulsified using a high-speed homomixer. Finally, 21.01 g of calcium gluconate powder was added and the whole mixture was emulsified using the high-speed homomixer.

The resulting emulsion was dried in a hot air circulation to provide about 30 g of a vitamin E-containing powdery preparation.

To 70 g of purified water were added 1.5 g of milk calcium powder (Milk Serum Calcium Powder, Healthway K. K.; reticular matrix-forming agent), 0.04 g of xanthan gum, 0.25 g of lecithin, and 1.2 g of dextrin under stirring to mix. Then, 6.0 g of vitamin D$_3$ was added to the above mixture, and pre-emulsification was carried out with a high-speed homomixer. Finally, 21.01 g of calcium gluconate powder was added and the whole mixture was emulsified using the high-speed homomixer. The resulting emulsion was dried in a hot air current to provide about 30 g of a vitamin D$_3$-containing powdery preparation.

EXAMPLE 6

To 85 g of purified water were added 0.75 g of pectin, 0.02 g of xanthan gum, 0.13 g lecithin, and 0.6 g of sodium alginate, followed by stirring to mix. Then, 3.0 g of raw royal jelly was added to the mixture and pre-homogenization was carried out using a high-speed homomixer. Finally, 10.5 g of calcium gluconate powder was added and emulsification was carried out with the high-speed homomixer. The resulting emulsion was dried in a hot air circulation to provide about 13 g of a royal jelly-containing powdery preparation.

EXAMPLE 7

In 70 g of purified water were poured 0.04 g of xanthan gum, 0.25 g of lecithin, 6.0 g of DHA-containing fish oil (DHA content: 20%), 22.51 g of calcium gluconate powder, and 1.2 g of a mixture of gelatin, pullulan, and K-carrageenin (13.2:12.0:1.3) in one operation and the mixture was emulsified using a high-speed homomixer. The emulsion thus obtained was dried in a hot air circulation to provide about 30 g of a DHA-containing powdery preparation.

INDUSTRIAL APPLICABILITY

In accordance with this invention described above, stable preparations containing oleaginous, physiologically active substances can be provided through the use of calcium gluconate and those preparations are stable and useful preparations which do not give off objectionable odors even when added to beverages.

We claim:

1. A composition consisting essentially of:
   a substance having an objectionable odor selected from the group consisting of docosahexaenoic acid (DHA), eicosahexaenoic acid (EPA), fat-soluble vitamins and carotenes;
   an effective amount of calcium gluconate to mask the odor of said substance, and
   a reticular matrix-forming agent selected from the group consisting of milk calcium, milk casein milk casein hydrolyzates and pectin.

2. The composition of claim 1, further comprising a sticking agent selected from the group consisting of thickening agents, jelling agents and mixtures thereof.

3. The composition of claim 2, wherein the thickening agent is selected from the group consisting of carboxymethylcellulose (CMC), starch, dextran, pullulan and gum arabic; and
   the jelling agent is selected from the group consisting of gelatin, carrageenin and alginic acid salts.

4. The composition of claim 1, wherein the substance having an objectionable odor is selected from the group consisting of fat-soluble vitamins and carotenes.

5. The composition of claim 4, wherein the fat-soluble vitamin is vitamin D, vitamin E or vitamin K.

6. The composition of claim 4, wherein the carotene is β-carotene.

7. The composition of claim 1, wherein the proportion of calcium gluconate is 50–90% by weight.

8. The composition of claim 1, which is a powder, bead, granule, tablet or capsule.

9. The composition of claim 1, wherein the proportion of matrix-forming agent is 1–20% by weight.

10. The composition of claim 2, wherein the proportion of sticking agent is 0.2–8% by weight.

11. The composition of claim 1, wherein the substance having an objectionable odor is a DHA-containing oil.

12. The composition of claim 1, wherein the substance having an objectionable odor is a DHA-containing fish oil.

13. The composition of claim 1, comprising a DHA-containing oil, casein phosphopeptide, gelatin and carrogenin.

14. A process for producing a composition having a masked odor, comprising:

mixing a substance having an objectionable odor selected from the group consisting of docosahexaenoic acid (DHA), eicosahexaenoic acid (EPA), fat-soluble vitamines and carotens, with an effective amount of calcium gluconate to mask the odor of said substance and a reticular matrix-forming agent selected from the group consisting of milk calcium, milk casein, milk casein hydrolyzates and pectin under stirring, then drying the mixture.

* * * * *